Patented Nov. 1, 1949

2,486,424

UNITED STATES PATENT OFFICE 2,486,424

PROCESS FOR STABILIZING EDIBLE FATTY OIL

Frank A. Lindsey, Jr., and William T. Maxwell, Savannah, Ga., assignors to The Southern Cotton Oil Company, Savannah, Ga., a corporation of New Jersey No Drawing. Application September 17, 1943, Serial No. 502,814

8 Claims. (Cl. 99—163)

Our invention relates to a procedure for improving the keeping qualities of edible shortenings, salad and cooking oils.

It is generally known that many oxidation inhibitors are available for oils and fats. Some of these antioxidants occur normally in nature, while others are synthetically prepared. Their use in edible fats is limited in most cases by the undesirable characteristics they impart to the product. In practice from 0.0001% to 0.1% of the old type antioxidants are used in shortenings, salad and cooking oils, the actual percentage being largely governed by the chemical composition and physical properties of the inhibitor.

There are a number of disadvantages in the use of the old type oxygen inhibitors or stabilizers. Not all of the undesirable effects on edible fats and oils that are listed below are necessarily imparted by the addition of any one stabilizer, but most of the old inhibitors have one or more of the following detrimental characteristics that greatly limit their use by the art:

(1) The smoking points of the fats and oils are materially lowered.

(2) The colors of the fats and oils are darkened; their darkening becoming more pronounced when the fats and oils are heated to a frying temperature.

(3) A "bead" is formed when the shortenings are melted. This "bead" is a ring of froth which stubbornly persists adjacent the sides of the container.

(4) Excessive frothing occurs when the fats and oils are used for frying.

(5) Distinct haze is apparent in salad and cooking oils and in the melted shortenings.

Although some of the old type oxygen inhibitors are quite effective in retarding the development of rancidity in edible oils and fats, they do not prevent a color reversion or darkening in the oil or fat; and, of still more importance, while they retard the development of a decided rancid flavor, the oils and fats so stabilized do become stale to the taste quite as rapidly as the untreated oils and fats. This fact is clearly indicated when the old type antioxidants are used with soybean cooking or salad oils, as with soybean oils the reversion in color and flavor is quite rapid. There is therefore an especial need for a satisfactory stabilizer for these soybean products.

In addition to the enumerated disadvantages of the old type antioxidants, many of these inhibitors also break down at frying or baking temperatures. This is a decided objection to their use, as they only preserve the shortenings and do not add to the keeping qualities of the food end-products.

One object of the invention is to provide edible fats or oils containing a stabilizer or oxygen inhibitor that is open to none of the objections above enumerated and which has the especial advantage of improving the keeping qualities of the products to a degree surpassing that of any heretofore known stabilizing agent. Another object of the invention is to provide practical and economical procedures for effecting stabilization.

By edible shortening we refer to a vegetable and/or animal fat, plastic at normal atmospheric temperature. The product may be of "compound" or of "hydrogenated" type. We designate as "compound" that type of shortening employing liquid oils of animal and/or vegetable origin mixed to a plastic consistency by the addition of high melting point stearine. By hydrogenated shortening we refer to liquid oils of animal and/or vegetable origin hydrogenated to a plastic consistency, with, in many instances, the addition of small amounts of high melting point stearine to raise the melting point of the product above the temperatures encountered in bake shops and kitchens. Included in these types of edible shortenings are several modifications that are well known to the art. These are classed as emulsifying shortenings, and are generally made of the hydrogenated type, though the compound type is sometimes used. These emulsifying shortening are usually made by the addition to, or formation in, the shortening of emulsifying agents such as mono- and/or di-glycerides or free fatty acids, and so forth.

By salad and cooking oils we refer almost exclusively to the vegetable oils, though some animal fat may be used, and include summer and winter oils. The winter salad oils may be of the winterized type, or they may be natural winter oils, such as corn oil and soybean oil.

Where in the claims we specify edible oils, we mean to thereby include the above described types of shortenings, salad and cooking oils.

The preferred means of stabilizing these products is to introduce the stabilizer to the oil or fat during the finishing or deodorizing process. Thus, the fatty products are provided with an oxygen inhibitor before exposure to the atmosphere. As the process of deodorization of fats and oils is well known to the art, it need not be described. .01% of citric acid is introduced into the deodorizer while the oil and fat is at an approximate temperature of 180 degrees centigrade and under a low pressure with steam agitation. Under these conditions, citric acid decomposes, and it is these decomposition products of citric acid that are effective as stabilizing agents. While this is the preferred procedure, it is only one of several ways, hereinafter described, of effecting stabilization in accordance with our invention.

The following is a more specific description of the process as we have practiced it on a plant scale. Eight hundred pounds of distilled vegetable fatty acids and six pounds of citric acid were added to a deodorizing kettle containing thirty thousand pounds of vegetable oil, all partially hydrogenated. The batch was agitated with steam, under an absolute pressure of twelve millimeters of mercury and at a temperature of 180 decomposition. Thus, with a given temperature the decomposition is more rapid at a lower pressure. At a temperature of 150° C., and at a pressure of 12 m. m., it will require several hours to decompose the citric acid; while at the same pressure, and at a temperature of 250° C. it will decompose in a few minutes.

We have found it practical to use from 0.0001% citric acid in fats and/or oils that require little stabilization to 1.0% citric acid in fats and/or oils that are extremely hard to stabilize. We also have obtained good results by varying the temperature of decomposition of the citric acid from 150 degrees centigrade to 250 degrees centigrade.

When citric acid is heated, it decomposes and breaks down as the following structural formulae indicate:

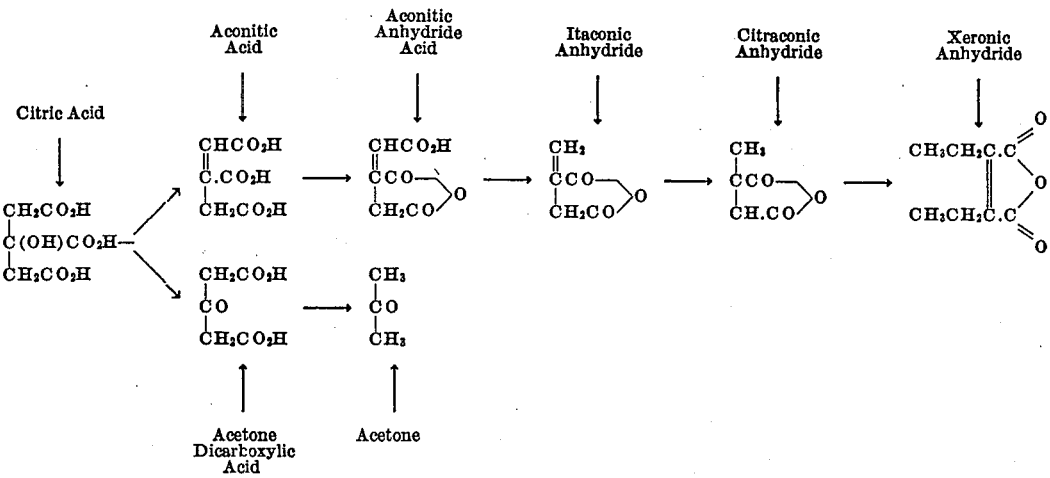

degrees centigrade, for one hour before cooling and subsequent filtering. This batch was duplicated. Both were blended with two batches, each of thirty thousand pounds, of vegetable oil, all partially hydrogenated, run through the deodorizer without the addition of fatty acids or citric acid. The total batch of over one hundred and twenty thousand pounds had a free fatty acid content of 1.20% calculated as oleic acid with an active oxygen test of well over three hundred hours. The odor and flavor of the shortening were excellent.

Emulsified shortening of this type is difficult to stabilize. Small traces of copper and iron in the free fatty acids act as oxidation catalysts. Without the described stabilizing, conventional active oxygen tests of such emulsified shortening are from six to eight hours and the color of the shortening reverts or darkens very rapidly.

Edible fats and oils treated as we describe with citric acid retain their original fresh odor and flavor for long periods. Their color does not darken or revert.

It should be understood, however, that the invention does not comprise broadly the addition of citric acid to the product to be stabilized. Merely dissolving citric acid in the liquid or melted fat, so that it remains as such in solution, has only a limited stabilizing effect. Our invention requires at least the partial, and preferably the complete, breaking down of the citric acid into its decomposition products. In the specific process described, such decomposition is effected.

The permissible temperature range in the process just described varies within rather wide limits. The preferred temperature will vary, as hereinbefore stated, with time and pressure and with the extent to which it is desired to effect the By varying the treatment of the oil or fat after the addition of the citric acid, any of the decomposition products may be made to predominate with the exception of acetone dicarboxylic acid, which breaks down into carbon dioxide and acetone and passes off upon the reaction. In stating that any one of the remaining decomposition products predominate, we do not mean that it is the sole antioxidant present, as the reactions illustrated in the structural formulae do not go to completion and all remain to some extent after the decomposition of the citric acid. We have found them all to be good oxygen inhibitors, though we prefer the citroconic anhydride to predominate. Citraconic anhydride may be made to predominate by a manipulation of the relation of the time, temperature and pressure factors. Thus, at 760 m. m. (atmospheric) pressure, citraconic anhydride may be made to predominate by treating citric acid at a temperature of 190° C. for approximately 2 hours, while at 12 m. m. pressure citraconic anhydride may be made to predominate by treating citric acid at a temperature of 180° C. for one hour. If in the latter example the treatment were continued for two hours a larger portion of the citraconic anhydride would be converted to xeronic anhydride.

The addition to edible shortenings, salad and cooking oils of the decomposition products of citric acid may be effected by other procedures with good results. The following three examples of such other procedures are practicable, and other modifications will suggest themselves to those skilled in the art:

(1) Citric acid may be added to the fat or oil in an atmosphere of an inert gas and heated above the decomposition temperature.

(2) Concentrates may be made by using large amounts of the citric acid in proportion to the fat or oil and, after decomposition of the citric acid, the concentrate may be used to stabilize shortenings and oils by adding it in proportionate quantities.

(3) Citric acid may be destructively distilled and the decomposition fractions blended with fatty acids and thus added to the shortenings and oils.

As a useful added step to any edible fat or oil that has been subjected to any one of the procedures above described, steam may be passed through the stabilized product, whereby such of the decomposition products as are in the anhydride form are changed to the acid form. The temperature of the fat or oil thus subjected to steam should be maintained below 100 degrees centigrade. This procedure does not affect the keeping qualities of the shortening and oil products and demonstrates that itoconic, citraconic and xeronic acids are as good antioxidants as their anhydrides.

Having described a number of embodiments of our invention, the qualities of edible shortenings, salad and cooking oils thereby produced may be listed as follows:

Stabilization against oxidation.
Stabilization against color reversion or darkening.
Maintenance of the odor or flavor.
No appreciable lowering of the smoking points of the products.
No darkening of color when heated to a frying temperature.
No substantial production of frothing when the products are used for frying.
No "beading."
Distinct improvements in keeping qualities.

What we claim and desire to protect by Letters Patent is:

1. The process of stabilizing an edible fatty oil which comprises adding thereto a small proportion of substantially isolated citric acid and heating the mixture to within a range of 150 to 250 degrees centigrade and continuing the heating for the time required, varying with the pressure and with the temperature within said range, to break down the citric acid into aconitic acid, aconitic acid anhydride, itaconic anhydride and citraconic anhydride, and arresting the process before decomposition proceeds beyond the formation of more than a minor amount of xeronic anhydride.

2. The process of stabilizing an edible fatty oil which comprises adding thereto a small proportion of substantially isolated citric acid and heating the mixture to within a range of 150 to 250 degrees centigrade and continuing the heating for the time required, varying with the pressure and with the temperature within said range, to break down the citric acid until its decomposition products comprise a predominant proportion of citraconic anhydride and then arresting the process, thereby obtaining a stabilized edible oil containing said decomposition products of which a predominant proportion is citraconic anhydride.

3. The process of stabilizing an edible fatty oil which comprises adding thereto a small proportion of substantially isolated citric acid and heating the mixture to within a range of 150 to 250 degrees centigrade and continuing the heating for the time required, varying with the pressure and with the temperature within said range, to break down the citric acid until the decomposition products contain a predominant proportion of citraconic and xeronic anhydrides, and then arresting the process before formation of more than a minor proportion of xeronic anhydride relative to the proportion of citraconic anhydride, thereby obtaining a stabilized edible oil containing said decomposition products with said anhydrides in a predominating proportion.

4. The process specified in claim 1 in which the heating is effected in an atmosphere of inert gas.

5. The process specified in claim 1 followed by passing steam through the stabilized product to convert the anhydrides to acids.

6. The process specified in claim 1 in which the proportion of citric acid added is between .001 and 1.0 per cent.

7. The process specified in claim 2 followed by passing steam through the stabilized product to convert the said anhydride into acid.

8. The process specified in claim 3 followed by passing steam through the stabilized product to convert the said anhydrides into acids.

FRANK A. LINDSEY, Jr.
WILLIAM T. MAXWELL.

REFERENCES CITED

The following references are of record in the file of this patent:

UNITED STATES PATENTS

| Number | Name | Date |
|---|---|---|
| 1,898,363 | Greenbank | Feb. 21, 1933 |
| 2,198,208 | Musher | Apr. 23, 1940 |
| 2,308,912 | Doegey | Jan. 19, 1943 |

OTHER REFERENCES

Whitmore Organic Chemistry, page 471.
Van Nostrand Co., New York, 1937, L-149.